United States Patent [19]

Hopkins et al.

[11] Patent Number: 4,763,255
[45] Date of Patent: Aug. 9, 1988

[54] METHOD FOR GENERATING SHORT FORM INSTRUCTIONS IN AN OPTIMIZING COMPILER

[75] Inventors: Martin E. Hopkins, Chappaqua; Henry S. Warren, Jr., Ossining, both of N.Y.

[73] Assignee: International Business Machines Corporation, Armonk, N.Y.

[21] Appl. No.: 65,175

[22] Filed: Jun. 16, 1987

Related U.S. Application Data

[63] Continuation of Ser. No. 666,800, Oct. 31, 1984, abandoned.

[51] Int. Cl.$^4$ ............................ G06F 9/28; G06F 9/44
[52] U.S. Cl. ..................................... 364/300; 364/200
[58] Field of Search .............................. 364/300, 715

[56] References Cited

U.S. PATENT DOCUMENTS

| | | | |
|---|---|---|---|
| 3,700,873 | 10/1972 | Yhap | 364/300 |
| 4,224,677 | 9/1980 | Kindell et al. | 365/715 |
| 4,247,891 | 1/1981 | Flynn et al. | 364/715 |
| 4,450,523 | 5/1984 | Pilat et al. | 364/200 |
| 4,454,578 | 6/1984 | Matsumoto et al. | 364/200 |
| 4,466,057 | 8/1984 | Houseman et al. | 364/200 |
| 4,542,456 | 9/1985 | Hill | 364/200 |

OTHER PUBLICATIONS

*Programming the M6800*, by Tim King et al., copyrighted 1983 (Addison—Wesley Pub. Co.), pp. 1–89, 124–145.

Primary Examiner—Gary V. Harkcom
Assistant Examiner—Lawrence E. Anderson
Attorney, Agent, or Firm—Roy R. Schlemmer

[57] ABSTRACT

A method for improving the quality of code generated by a compiler or assembler, for a target machine that has short and long forms of some of its instructions with the short forms executing faster or occupying less space. The method first determines which bits of the result of each computational instruction are significant, by a backwards pass over the program that is similar to liveness analysis. Then the significant bits thus computed are used to guide the code selection process to select the most efficient instruction that computes the correct result in all the significant bit positions.

11 Claims, 3 Drawing Sheets

METHOD FOR GENERATING SHORT FORM INSTRUCTIONS IN AN OPTIMIZING COMPILER

This application is a continuation of application Ser. No. 06/666,800 filed Oct. 31, 1984, now abandoned.

FIELD OF THE INVENTION

This invention has particular utility in a compiler for a digital computer in which optimization algorithms are used to improve the quality of the code. It could also be used in an assembler, although optimizing assemblers are not common. This invention improves the quality of the object code generated by the compiler or assembler.

The invention is applicable to computers that use an accumulator or a set of general registers, and that have one or more instruction types that exist in two or more forms, with the forms differing in the length of the operands. Furthermore, for this invention to be applicable there must be some reason to prefer a shorter form on an instruction, when it can be used. On many machines, the shorter forms are preferable because they execute faster, or they occupy less storage, or both.

BACKGROUND OF THE INVENTION

The quality of code produced by compilers has been an issue ever since the first compiler was produced. One of the principal objectives of IBM's FORTRAN I compiler, the first commercially available compiler, was to produce object code in the field of scientific computations which was comparable in code quality to that produced directly by assembly language programmers coding "by hand."

Today, higher level languages are designed to be used in every field in which computers are applicable. Even the original FORTRAN language has been bolstered to make it applicable to a wide range of programming tasks. However, it is still important that the quality of code produced by the compiler be high, especially if the resultant code is to be used in a production environment. Code produced by a skilled assembly language programmer is still the yardstick against which compiler produced code is measured.

A large number of optimization techniques have been developed and refined since the 1950's to improve the quality of compiler generated code. Indeed, many of these optimizations were known in principle, and used in some fashion by the team that produced the first FORTRAN compiler.

Optimizations that are frequently employed in optimizing compilers can be divided into two classes, which are commonly known as "global" and "peephole" optimizations. Global optimizations are those that are based on an analysis of the entire program being compiled. Examples are "code motion" (moving code out of loops) and "common subexpression elimination." Peephole optimizations are those that are based on an analysis of a relatively small region of the program, such as a "basic block," or perhaps only two adjacent instructions.

The present invention can be implemented as a global optimization, or at the basic block level, or it can use partial global information that is normally readily available from global analysis, and then refine this information at the basic block level. With more information available, it is more effective. The information from global analysis that it can profitably use is that of live/dead information. This information tells, for each register operand of an instruction, whether or not that register can be used again before it is reloaded with a new quantity.

If a register operand of an instruction is "dead," that means that the instruction is the "last use" of the register, and after executing the instruction the contents of the register could be altered in any way without affecting the execution of the program. If a register operand of an instruction is "live," on the other hand, that means that the contents of the register cannot be altered after execution of the instruction, because there may be an execution path in which the register's contents are used again.

The following references discuss live variable analysis:

J. D. Ullman, *A Survey of Data Flow Analysis Techniques*, Second USA-Japan Computer Conference Proceedings, AFIPS Press, Montvale, N.J., (1975), pp 335-342 (contains 37 references).

A. V. Aho and J. D. Ullman, *Principles of Compiler Design*, Addison-Wesley, (1977).

M. S. Hecht, *Flow Analysis of Computer Programs*, Elsevier North-Holland, N.Y., (1977).

The Motorola MC68000 is an example of a type of computer to which this invention is applicable. This computer has three forms of "add," and three forms of "add immediate," as illustrated below.

| ADD.L r1,r2 | ADDI.L #123,r1 |
| ADD.W r1,r2 | ADDI.W #123,r1 |
| ADD.B r1,r2 | ADDI.B #123,r1 |

ADD.L (add long) adds the entire 32-bit contents of register r1 to register r2, and places the result in r2. ADD.W (add word) adds the rightmost 16 bits of r1 to the rightmost 16 bits of r2, leaving the leftmost 16 bits of r2 unchanged. ADD.B (add byte) adds the rightmost eight bits of r1 to the rightmost eight bits of r2, leaving the leftmost 24 bits of r2 unchanged. Similarly, ADDI.L (add immediate long) adds a number (123 is shown) to the entire 32-bit contents of register r1, ADDI.W adds to the rightmost 16 bits, and ADDI.B adds to the rightmost eight bits.

The instructions ADD.W and ADD.B execute faster than ADD.L, and hence are preferred in a situation in which either would do. The instructions ADDI.W and ADDI.B execute faster and occupy less storage than ADDI.L, and hence are preferred to ADDI.L.

The Motorola MC68000 has many other instruction types that exist in "long" and "short" forms, with the shorter form being faster in execution and often occupying less storage. Further details, including instruction timings, may be found in:

MC68000 16-bit Microprocessor User's Manual, Second edition, Motorola, Inc., (January 1980).

As an example of the code improvement accomplished by this invention, suppose a compiler has generated the instruction sequence:

| ADD.L | r2,r1 |
| SUBI.L | #16,r1 |
| MOVE.W | r1,6(r5) | and suppose further that the MOVE.W instruction, which stores the rightmost 16 bits of register r1 into storage at a location addressed by the contents of register r5 plus 6, is the last use of register r1. Then this invention will replace the ADD.L instruction with ADD.W, and the SUBI.L instruction with SUBI.W. The latter forms execute faster than the former, and the SUBI.W instruction occupies less storage than SUBI.L.

DESCRIPTION OF THE PRIOR ART

A number of computer data bases were searched for prior art. No art relevant to this invention was found.

SUMMARY AND OBJECTS OF THE INVENTION

It is a primary object of the present invention to provide an optimizing compiler with a module that replaces certain generated instructions with instructions that are equivalent in the sense that they do not change the overall computation performed by the program, but are preferable in that they execute faster and/or occupy less storage.

It is a further object of the invention to utilize a generalization of the concept of "liveness" analysis of a program.

It is another object to utilize this generalization for calculating which bits of a general register are "live" at a point in the program, rather than calculating only a summary bit which indicates whether or not any bit in the register is live, as is the usual practice. In the following description this generalization is called "significant bit analysis."

DESCRIPTION OF THE PREFERRED ENBODIMENT

The invention will be described as it fits into an optimizing compiler, and for the Motorola MC68000 target machine.

The first step in applying this invention is to do "significant bit analysis" of the program being compiled. This is a process of determining, for each instruction, which bits of the result of that instruction are "significant" (it is assumed, for simplicity, that there is only one result). A bit is significant if it is used by the program after being computed. This is the same concept as the well known "liveness," except that each bit of the result is examined to determine whether or not it is "live," or "significant." In conventional liveness analysis, only a single summary bit is computed for each instruction, which indicates whether or not any bits of the result are "live," or "significant."

There are three levels at which significance analysis could be done:
1. Globally, as ordinary liveness analysis is done,
2. On a basic block (actually branch-to-branch) level, with assistance from global liveness analysis, or
3. On a basic block (or branch-to-branch) level with no assistance.

The first choice above is the most expensive to compute but gives the best results. The last is the cheapest to compute but gives the poorest results. The second is a compromise that is only a little more expensive to compute than (3) if liveness analysis has been done anyway, and gives results of intermediate quality. Choice (2) will be described herein, however the invention is not intended to be limited to this particular approach.

Figure 1:
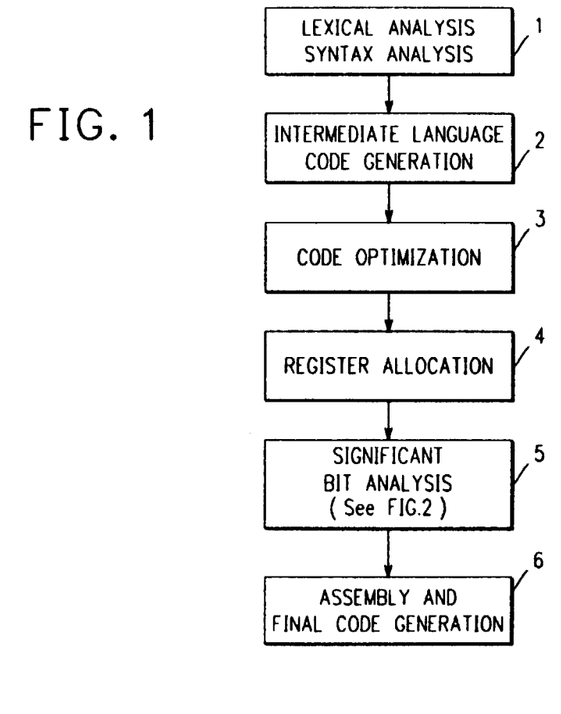
FIG. 1 is a very high level functional flowchart of an optimizing compiler in which the present invention has particular utility.

FIG. 1 shows where level (2) of significant bit analysis (block 5) is most conveniently done within the framework of a typical optimizing compiler. The important thing is that global code optimization (block 3) is done before significant bit analysis. This is because conventional liveness analysis is part of global code optimization, and we will need the "last use" bits that are a byproduct of liveness analysis.

It is preferable, although not necessary, that register allocation (block 4) be done before significant bit analysis. This permits a more efficient compiler, because if register allocation is done first, significant bit analysis can be done in terms of the real registers of the machine, and there is usually a fairly small number of them (e.g., 16 on the Motorola MC68000).

Significant bit analysis has to be done before final code generation (block 6). The final code generation module of the compiler will use the results of significant bit analysis to determine what form (8-, 16-, or 32-bit) of each instruction to generate.

Figure 2:
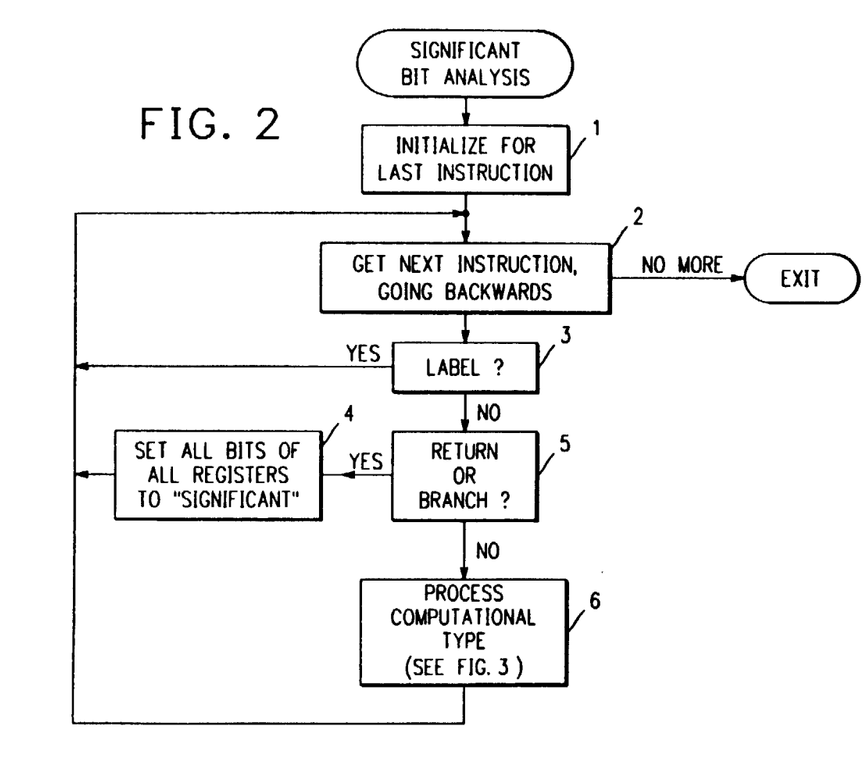
FIG. 2 is a high level flowchart of the herein disclosed compiler module for effecting the desired significant bit analysis.

FIG. 2 is a high level flowchart of the significant bit analysis shown in block 5 of FIG. 1. The analysis is done in a single backwards pass over the program. Although the processing shown here could be done on a basic block basis, it is shown being done on a branch-to-branch basis. This is just as easy to program, and it will sometimes result in better quality code being generated. Thus label points in the program are ignored (block 3). However, branch instructions (block 5) result in resetting the program's knowledge of which bits are significant in each register, to the state "all bits of all registers are presumed to be significant." This is the safe state to assume of those points at which the program has no information.

If an instruction is not one that represents a label point, and is not a branch or subroutine "return" instruction, then it is an ordinary computational instruction such as "add," "load," "store," "shift," etc. The processing of computational instructions, shown as block 6 of FIG. 2, is shown in more detail in FIG. 3.

This program works with an array of bits referred to herein as the significant bit table (SBT), that has a number of rows equal to the number of registers on the machine (e.g., 16 on the Motorola MC68000), and a number of columns equal to the register length of the machine (32 on the MC68000). At a typical point in processing, the array might look like this:

| 32 bits | |
|---|---|
| 0. 0000FFFF | 8. FFFFFFFF |
| 1. FFFFFFFF | 9. 0000FFFF |
| 2. FFFFFFFF | 10. 000001FF |
| 3. FFFFFFFF | 11. 7FFFFFFF |
| 4. FFFFFFF0 | 12. 0F0F0F0F |
| 5. 000000FF | 13. 0000FF00 |
| 6. FFFFFFFF | 14. FFFFFFFF |
| 7. FFFFFFFF | 15. FFFFFFFF |

Here we have shown the bits in hexadecimal notation, e.g., "0000FFFF" denotes 16 zero-bits followed by 16 one-bits. The values in the array change as the program scans backwards in the instruction stream. If, at a certain point, the array has the values shown above, then the meaning is that at that point, the leftmost 16 bits of register 0 are not significant ("dead"), but the rightmost 16 bits are significant. A value of "FFFFFFFF" means that all bits in the associated register are significant, etc.

Figure 3:
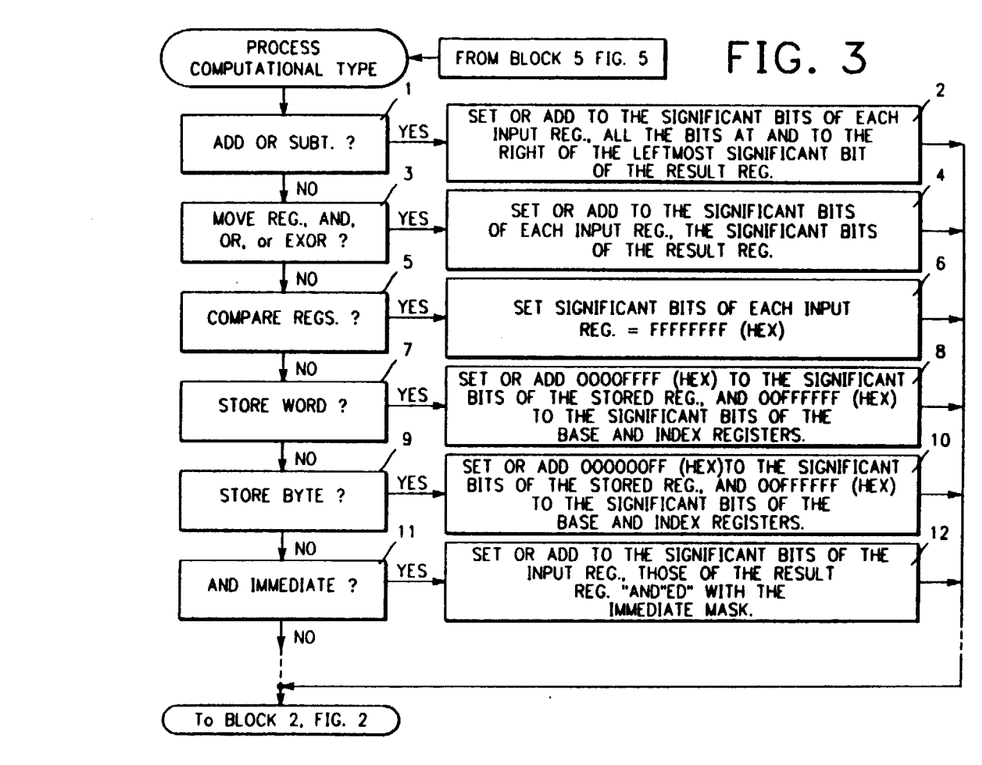
FIG. 3 is a more detailed flowchart illustrating how some of the computational types of instructions are processed by the herein disclosed compiler module.

Now, with reference to FIG. 3, let us see how an instruction is processed to determine the significant bits of its result. The process is to propagate the significant bits from a result to the input operands of an instruction. Then, it is propagated from the input operands of a current instruction to the result operands of earlier instructions, as the program scans backwards through the instruction stream. Just how the bits propagate from a result to the input operands depends on the instruction type (add, shift, store, etc.), as shown in FIG. 3. To get started, the program must know, or assume, which bits of the result of the first encountered instruction are significant. For the process being described, the first encountered instruction is assumed to have all its result bits significant. This is recorded by initializing the entire 16×32 bit array to all one's when a branch instruction is encountered.

Now, suppose the middle of a branch-to-branch section of code is being currently processed, and an add or subtract instruction is encountered. In particular, suppose the instruction is:

ADD.L r1,r2

This means to add the contents of register r1 to the contents of register r2. Register r2 is both an input to and the result of the instruction. It will be easier for us to think in terms of a three-address instruction:

ADD.L r1,r2,r3 in which r3 is the result register.

First it is necessary to refer to the significant bit table at position r3, to see what bits of the result are significant. The bit mask retrieved from the table is associated (stored) with the add instruction, so that it can be used later by the assembly and final code generation module to generate the optimum form of the add instruction. Actually, for efficiency it suffices to associate only two bits with the add instruction, to record whether the instruction should be generated in long (32-bit) form, word (16-bit) form, or byte (8-bit) form, as those are the only choices on the MC68000. This association of two bits with the instruction will be referred to subsequently as "marking" the instruction.

Suppose the significant bits of the result register r3 (as determined for the SBT) are X'00008012'. Then we can mark the add instruction as "word," or 16-bit, form, because all significant bits of the result lie in the rightmost 16 bits of register r3. Then, since addition is a right-to-left process (two's complement arithmetic is assumed throughout), the bits in the leftmost 16 positions of registers r1 and r2 cannot possibly affect a significant bit of the result, but bits anywhere in the rightmost 16 positions can. Therefore, the significant bits of registers r1 and r2 for this instruction are X'0000FFFF'. This is next recorded in the SBT table, at the rows for registers r1 and r2. If the add instruction is the last use of r1 (or r2) in that block, then the table position for r1 (or r2) is set to X'0000FFFF'. This is determined by looking at the liveness bit described above which may be set during the "Code Optimization" phase. On the other hand, if the add instruction is not the last use of r1 (or r2), then we "OR" X'0000FFFF' into the table at position r1 (or r2). The point is that r1 and r2 may have certain bits significant because of uses of these registers below the add instruction, i.e., uses that were processed earlier in this backwards scan, and wherein those significant uses must not be "forgotten". This processing of an add (or subtract) instruction is shown in blocks 1 and 2 of FIG. 3.

As the backwards scan proceeds, it will likely come to an instruction that sets r1 or r2. At this point, it refers to the table at position r1 or r2, respectively, to determine which bits of that register are significant. It then propagates this information back to the input operands, in a manner similar to the processing of the add instruction described above.

Suppose as another example that a "store byte" instruction is encountered (FIG. 3 blocks 9 and 10). This instruction would be written:

MOVE.B r1,d(r2,r3)

in which register r1 contains the byte being stored, and r2 and r3 are "base" and "index" registers that serve to address storage. "d" is a displacement (a constant) that has no role in significance analysis. The MOVE instruction has no result register (it doesn't alter the contents of any register). It uses only the rightmost eight bits of register r1. Therefore, a mask of X'000000FF' is OR'ed into the table at the position of r1. The MOVE instruction uses the right-most 24 bits of the base and index registers, so a mask of X'00FFFFFF' is OR'ed into the table at the positions of r2 and r3.

FIG. 3 shows the processing of six instruction types. The complete process should be expanded to include other instruction types not shown in FIG. 3, such as "load" and "shift" instructions, etc.

To now present a more substantial example, suppose that a sequence of code between branches is:

|  | significance of r1 |
| --- | --- |
| MOVE.L  4(r2),r1 | 0000FF00 |
| LSR.L  #8,r1 | 000000FF |
| ANDI.L  X'000000FF',r1 | 000000FF |
| MOVE.B  r1',0(r2) | FFFFFFFF |

The program reads a long word (32 bits) from memory, shifts it right eight positions (LSR = logical shift right), "AND's" it with the mask X'000000FF', and stores the rightmost byte of register r1 into main memory. The column headed "significance of r1" shows one row of the significance array, that for r1, as processing proceeds backwards. The following will describe what happens to the significance of r1 as this sequence of instructions is processed.

Initially (bottom row), the significance of r1 is set to X'FFFFFFFF', which is what has to be assumed in the absence of any knowledge. Then the MOVE.B instruction is encountered. For this example, assume that the use of r1 in this instruction is flagged as a "last use," which has been denoted with a prime (') after r1. Then the significance or r1 is set to X'000000FF' in the table, following FIG. 3 block 10.

Next the ANDI.L is encountered. This instruction uses r1 as both an input and the result register. The significance of r1 as a result, X'000000FF', is "AND'd" with the mask, also X'000000FF', and the result, "X'000000FF' is "OR'ed" into the table for position r1. The result is "X'000000FF' (no change to the significance of r1). These steps are summarized in FIG. 3 block 12.

Now at this point, the significance analysis program could observe that the "AND" instruction turns off only insignificant bits, and hence can be omitted. Alternatively, the instruction could be marked as byte form, and final code generation could delete it, since the immediate mask ends in eight "1" bits.

Next the LSR.L is encountered. It is marked as byte form, because the significance of the result is X'000000FF'. The significance of the input register, r1, is the significance of the result register, also r1, shifted left eight positions (handling of shifts is not shown in FIG. 3).

Lastly, the MOVE.L is encountered. This is marked as word (16-bit) form, because the significance of the result register (r1) is X'0000FF00', i.e., only bits in the rightmost 16 positions are significant.

By using the marking computed above, final code generation can output the following instructions as a faster and shorter equivalent to those shown above:

| | |
|---|---|
| MOVE.W 6(r2),r1 | (load instruction from memory) |
| LSR.W #8,r1 | |
| MOVE.B r1',0(r2) | (store instruction to memory) |

There are two things that final code generation must be cognizant of that arise in the above example: (1) the MOVE.L cannot be changed to MOVE.W unless the increase of two in the displacement (from 4 to 6 in the example) results in a displacement within the limits allowed by the instruction (32767 for the MC68000), and (2) the selection for the most efficient form of the LSR instruction depends upon the significance of the result and the shift amount. In the example, the significance of the result is X'000000FF', but the LSR instruction cannot be made LSR.B, because bits in positions 16–23 of register r1 are shifted into positions 24–31. It can, however, be made LSR.W, which is faster than the original LSR.L.

Appendix I shows a complete working subroutine for performing significance analysis. It includes the steps that were illustrated in FIG. 2 and FIG. 3. It has been utilized successfully with several target machines: the Motorola MC68000, the IBM System/370, and several experimental reduced instruction set machine architectures. It is written in a language similar to PL/I, and is sufficiently annotated to allow any skilled programmer to incorporate the present invention into an optimizing compiler of the form shown in FIG. 2, or to rewrite the subroutine in another language, or for another target machine, or for a compiler or assembler of different structure.

It will of course be appreciated that the specific significance values introduced into the bit table would have to be tailored to a specific system architecture and particular instruction format. The invention would have equal applicability to, for example, a 16 bit full word machine as well as to a 45 or 64 bit machine architecture. It should be noted more particularly, that the advantages of the present invention will be realized in a machine architecture where the shorter form instructions take less machine time or less storage space than the longer form regardless of the underlying and length of the machine.

APPENDIX I

```
P5OPTB: PROC;
/OFF*******************************************************
    Phase 5 optimization, backward pass.  This program runs at the
beginning of phase 5, after the forward optimization pass, and performs
several optimizations at approximately the basic block level.
    This program collects information on a branch-to-branch basis, to
find which bits of each register are significant (live).  This is used
to shorten ops from fullword to halfword or byte form, which is very
advantageous on the M68000.  On the S/370, only a few optimizations are
possible.  The ones that are done on the S/370 are (see P5AS370 for the
enabling conditions):
        LC      ==> IC      (Register clearing step omitted)
        LHZ     ==> LH      (Register clearing step omitted)
        AI      ==> LA
        SI      ==> LA
        SFI     ==> LA,LCR
Also, unnecessary NI's are detected and omitted (all target machines).
    Some other S/370 transformations that could be done are:
    3-address A could be changed to LA (instead of LR, AR).
    "LI R,0" could be changed to "SR R,R" when the CR is dead, if this
routine were modified to keep track of when the CR is dead.
    With a few exceptions, this routine doesn't actually do the
optimizations.  This routine merely sets bits in the execution list
indicating the length of the target that gets used (TARGLEN).  Then a
later, machine dependent, phase 5 routine uses TARGLEN to generate
good code (see P5AS370 and P5AM680).  TARGLEN is a 2-bit quantity
encoded as follows:
```

00 Normal, 32-bit target
01 1-byte target
10 2-byte target
11 3-byte target

TARGLEN is primarily an output of this routine. However, for
compares and traps, TARGLEN is an input, having been set by P5OPTF.
P5OPTF does a forward pass over the program, tracking values in the
registers, and it "demotes" compares and traps to halfword or byte
length when it can see that the quantity in the register has 16 leading
zeros, or is a "halfword algebraic" quantity (loaded by LHA), etc.
Then, this routine uses TARGLEN for compares and traps to propagate
backward the fact that the leftmost 16 or 24 bits of the tested register
are not used by the compare or trap. This can simplify the instructions
that feed the comparands. Example:
```
      LHA   R1,...
      CI    R1,80
      BT    cr,GT,...
```
In the forward pass (P5OPTF), we mark the CI as being demotable to
halfword length (set TARGLEN = 2 for it). Then, on the backward pass
(this routine), we mark the LHA as being demotable to halfword length.
Then when code is generated for the LHA on the M68000, the sign
extension step is omitted. This optimization only works for a machine
that really does have a halfword form of compare, i.e., one that ignores
the high order bits. Our only target machine with this capability is the
M68000, so P5OPTF only demotes compare and trap ops on that machine.

Optimizations that this routine does do are:
1. NI removal (if all bits turned off are insignificant), and
2. Change M23 to MH on M68000.
For the S801 and ROMP, only the NI removal is applicable.

Miscellaneous notes:
This program does not deal with the program base register (S/370), as
that is not mentioned in the IL.

```
/***********************************************************************/

DCL X             OFFSET(IL),       /* Current instruction. */
    SIG(-1:31) BIT(32),             /* Significance bits for each register. */
                                    /* -1 is CR, 0-31 are general regs. */

SIGCCR    LIT('SIG(-1)'),       /* Overlay for sig(-1) (ccr). */
    LASTREG   INTEGER,              /* Highest register number (15 or 31). */
    SIGBX     BIT(32);              /* Significance bits for a base/index use. */
DCL P5AREG  ENTRY(OFFSET(IL) VALUE, INTEGER VALUE) RETURNS(INTEGER);
%INCLUDE P4L;

/*******************************************************************///ON**/

START:
   IF S801 THEN LASTREG = 31; ELSE LASTREG = 15;

IF S370         THEN SIGBX = '7FFFFFFF'XB;    /* Allow for 31-bit addr. */
   ELSE IF M680    THEN SIGBX = '00FFFFFF'XB;
   ELSE /* S801, ROMP */ SIGBX = 'FFFFFFFF'XB;

DO X = $->IL_BC REPEAT X->IL_BC UNTIL(X = $); /* Scan inst'ns. */
      SELECT(OP);
         WHEN(OP_LABEL, OP_BB, OP_PROC, OP_PEND)  /* Ignore. */;
         WHEN(OP_RETURN, OP_B, OP_BNWAY)
```

```
            CALL SIGRESET;              /* Set all bits of all regs "significant." */
        WHEN(OP_BT, OP_BF)
            CALL SIGBC;                 /* Handle tested reg or ccr. */
        OTHERWISE
            CALL SIGRFC;                /* Process computational type. */
        END SELECT /* op */;
    END /* do until (backwards scan). */;
RETURN;

/*----------------------------------------------------------------------*/

SIGRFC: PROC;                           /* X is main input. */

DCL RA          INTEGER,            /* Target reg, except source for stores. */
        RB          INTEGER,            /* First input operand. */
        X_PEEK      OFFSET(IL),         /* Peek back instruction pointer. */
        RA_PEEK     INTEGER,            /* Target symbolic reg, peek back. */
        SHIFT_AMOUNT INTEGER,
        MASK        BIT(32),
        MASK_TAB(0:3) BIT(32) CONSTANT INIT  /* Translates targlen to mask. */
        ('FFFFFFFF'XB, '000000FF'XB, '0000FFFF'XB, '00FFFFFF'XB);

RA = P5AREG(X, $RA);                /* Set RA to the target or, in the case
                                           of a store, the source. */
    SELECT(OPS_TYPE(OP));               /* Select on operator type. */
        WHEN(ETF_RR) SELECT(OP);
            WHEN(OP_A, OP_DOZ, OP_M23, OP_S, OP_SOA) DO;
                                        /* These ops use only those bits of RB and
                                           RC that are live in RA or to the right of
                                           live bits in RA. */
                CALL DEMOTE;
                CALL SIGUSE_BCD(RP(SIG(RA)), RP(SIG(RA)), 0);
                IF OP = OP_M23 THEN IF M680 THEN IF SIG(RA) <= '0000FFFF'XB THEN
                    CALL CHANGE_TO_MH;  /* Change to mult halfword (MULS). */
                END /* OP_A, .... */;
            WHEN(OP_MR, OP_N, OP_O, OP_X) DO;
                                        /* These ops use only those bits of RB and
                                           RC that are live in the target RA. */
                CALL DEMOTE;
                CALL SIGUSE_BCD(SIG(RA), SIG(RA), 0);
                END /* OP_MR, .... */;
            WHEN(OP_C, OP_CL) DO;       /* These use all 32 bits of their input
                                           operands. Cannot demote to len target.
                                           However, they may have already been demoted
                                           by P5OPTF (M68000 only). Caution: if the
                                           first operand is an address reg, all 32
                                           bits of it are being used. */
                RB = P5AREG(X, $RB);
                IF RB >= 8 THEN MASK = 'FFFFFFFF'XB;
                        ELSE MASK = MASK_TAB(X->TARGLEN);
                CALL SIGUSE_BCD(MASK, MASK_TAB(X->TARGLEN), 0);
                END /* OP_C, .... */;
            WHEN(OP_SAR, OP_SR) DO;
                                        /* These use all 32 bits of RB, but only
                                           the rightmost 5 or 6 bits of RC. We demote
                                           it but that info probably won't be used. */
                CALL DEMOTE;
                CALL SIGUSE_BCD('FFFFFFFF'XB, '0000003F'XB, 0);
                END /* OP_SAR, .... */;
```

```
WHEN(OP_SARI) DO;                /* SARI uses only those bits of RB that are
                                    to the left of the significant bits of
                                    RA, by the shift amount, and the sign bit,
                                    if the sign is shifted into a signif. pos. */
  CALL DEMOTE;
  SHIFT_AMOUNT = MIN(X->REG($RC), 31);    /* Treat large shifts
                                              like 31. */

/* For M68000, change to RINM with mask of all 1's (becomes ROL),
     if profitable and if extended sign bits aren't needed. */

IF M680 THEN IF SHIFT_AMOUNT >= 24 THEN
    IF SIG(RA) <= SHIFTR('FFFFFFFF'XB, SHIFT_AMOUNT) THEN
      CALL CHANGE_TO_RINM(32-SHIFT_AMOUNT, 'FFFFFFFF'XB);

/* Calculate significance of RB, and put in SIG array. */
  MASK = SHIFTL(SIG(RA), SHIFT_AMOUNT);
  IF SUBSTR(SIG(RA), 1, SHIFT_AMOUNT) ¬= 0 THEN
    MASK = MASK | '80000000'XB;
  CALL SIGUSE_BCD(MASK, 0, 0);
  END /* OP_SARI. */;

WHEN(OP_SL) DO;
                                 /* This uses only those bits of RB that
                                    are significant in RA or to the right of
                                    significant bits in RA, and only the
                                    rightmost 5 or 6 bits of RC. */
  CALL DEMOTE;
  CALL SIGUSE_BCD(RP(SIG(RA)), '0000003F'XB, 0);
  END /* OP_SL */;

WHEN(OP_SLI) DO;                 /* SLI uses only those bits of RB that are
                                    to the right of the significant bits of
                                    RA, by the shift amount. */
  CALL DEMOTE;
  SHIFT_AMOUNT = X->REG($RC);

IF M680 THEN DO;

/* We change the SLI to a RINM if (1) shift amount = 24 and
       rightmost 24 bits of result are not significant, or if (2) shift
       amount > 24.  In the latter case the RINM may become an ROR alone
       or may become an ROR followed by NI.  To omit the NI when it's
       unnecessary (when it would turn off only insignificant bits), we
       set the NI's mask to 'FFFFFFFF'XB when possible. */

IF (SHIFT_AMOUNT = 24 & ((SIG(RA) & '00FFFFFF'XB) = 0))
       | SHIFT_AMOUNT > 24 THEN DO;
      MASK = SHIFTL('FFFFFFFF'XB, SHIFT_AMOUNT);
      IF (SIG(RA) & ¬MASK) = 0 THEN MASK = 'FFFFFFFF'XB;
      CALL CHANGE_TO_RINM(SHIFT_AMOUNT, MASK);
      END;
    END /* IF M680. */;

CALL SIGUSE_BCD(SHIFTR(SIG(RA), SHIFT_AMOUNT), 0, 0);
  END /* OP_SLI. */;

WHEN(OP_SRI) DO;                 /* SRI uses only those bits of RB that are
                                    to the left of the significant bits of
                                    RA, by the shift amount. */
```

```
CALL DEMOTE;
SHIFT_AMOUNT = X->REG($RC);

IF M680 THEN DO;

/* We change the SRI to a RINM if (1) shift amount = 24 and
   SIG(RA) <= '000000FF'XB (will become ROL only), or if (2) shift
   amount > 24.  In the latter case the RINM may become an ROL alone
   or may become an ROL followed by NI.  To omit the NI when it's
   unnecessary (when it would turn off only insignificant bits), we
   set the NI's mask to 'FFFFFFFF'XB when possible. */

IF (SHIFT_AMOUNT = 24 & SIG(RA) <= '000000FF'XB)
     | SHIFT_AMOUNT > 24 THEN DO;
     MASK = SHIFTR('FFFFFFFF'XB, SHIFT_AMOUNT);
     IF SIG(RA) <= MASK THEN MASK = 'FFFFFFFF'XB;
     CALL CHANGE_TO_RINM(32-SHIFT_AMOUNT, MASK);
     END;
   END /* IF M680 */;

CALL SIGUSE_BCD(SHIFTL(SIG(RA), SHIFT_AMOUNT), 0, 0);
   END /* OP_SRI. */;
OTHERWISE DO;          /* Do default RR op, assume it uses all
                       32 bits of RB and RC (RD not used).
                       Demote to the length of its target.
                       Examples: ABS, D23, MOD23, CVFL31. */
 IF RA <= 31 THEN CALL DEMOTE;
 CALL SIGUSE_BCD('FFFFFFFF'XB, 'FFFFFFFF'XB, 0);
 END /* OTHERWISE. */;
END /* ETF_RR. */;

WHEN(ETF_RRR) SELECT(OP);   /* The only RRR ops really worth doing are
                            RINM and RNM.  They're generated on the
                            M68000.  The other RRR's are only generated
                            for the S801, where this whole pass is of
                            little or no significance.  However, we do
                            them all in case it should prove useful
                            later. */
WHEN(OP_LIST);              /* No-op. */
WHEN(OP_T) DO;              /* This uses all 32 bits of its input
                            operands.  Cannot demote to len target.
                            However, it may have already been demoted
                            by P5OPTF (M68000 only). */
  MASK = MASK_TAB(X->TARGLEN);
  CALL SIGUSE_BCD(MASK, MASK, MASK);
  END /* OP_T */;
WHEN(OP_RIMI) DO;
  CALL DEMOTE;
  MASK = X->REG($RE);
  CALL SIGUSE_BCD(SIG(RA) & ¬MASK,
     ROTATER(SIG(RA)&MASK, X->REG($RD)), 0);
  /* RD is the shift amount, RE is the mask. */
  END /* OP_RIMI. */;
WHEN(OP_RINM) DO;
  CALL DEMOTE;
  MASK = X->REG($RD);
  CALL SIGUSE_BCD(ROTATER(SIG(RA)&MASK, X->REG($RC)), 0, 0);
  /* RC is the shift amount, RD is the mask. */
  END /* OP_RINM. */;
```

```
WHEN(OP_RMI) DO;
  CALL DEMOTE;
  MASK = X->REG($RE);
  CALL SIGUSE_BCD(SIG(RA) & ¬MASK, 'FFFFFFFF'XB, '0000001F'XB);
  /* RD is the shift amount (variable), RE is the mask. */
  END /* OP_RMI. */;
WHEN(OP_RNM) DO;
  CALL DEMOTE;
  MASK = X->REG($RD);
  CALL SIGUSE_BCD('FFFFFFFF'XB, '0000001F'XB, 0);
  /* RC is the shift amount, RD is the mask. */
  END /* OP_RNM. */;
WHEN(OP_SRIB) DO;
  CALL DEMOTE;
  CALL SIGUSE_BCD(SIG(RA), '80000000'XB, '0000001F'XB);
  END /* OP_SRIB. */;
WHEN(OP_LDSR);              /* Ignore. */
OTHERWISE DO;               /* All RRR ops are done above. */
  CALL XERROR(BLDMSG1(XE_1019, OPS_NAME(OP)), 0);
  /* 1019C P5OPTB, unexpected RRR op: 'op_code' */
  END /* OTHERWISE. */;
END /* ETF_RRR. */;

WHEN(ETF_RI) SELECT(OP);
  WHEN(OP_AI, OP_DOZI, OP_M23I, OP_SFI, OP_SI) DO;
                            /* These ops have one input reg, and they use
                               the bits of it that are significant in RA or
                               to the right of significant bits in RA. */
    CALL DEMOTE;
    CALL SIGUSE(P5AREG(X, $RB), X->DEAD($RB), RP(SIG(RA)));
    END /* OP_AI, .... */;
  WHEN(OP_OI, OP_XI) DO;
                            /* These ops have one input reg, and they use
                               the bits of it that are significant in RA. */
    CALL DEMOTE;
    CALL SIGUSE(P5AREG(X, $RB), X->DEAD($RB), SIG(RA));
    END /* OP_OI, .... */;

WHEN(OP_CI, OP_CLI) DO;   /* These ops have one input reg, and use all
                               bits of it that are indicated by TARGLEN.
                               Then have no target. */
    MASK = MASK_TAB(X->TARGLEN);
    CALL SIGUSE(P5AREG(X, $RB), X->DEAD($RB), MASK);
    END /* OP_CI, OP_CLI */;
  WHEN(OP_LA) DO;           /* LA has two input regs, and uses all bits
                               of them that are significant in RA or to the
                               right of significant bits in RA. */
    CALL DEMOTE;
    CALL SIGUSE_BCD(RP(SIG(RA)), RP(SIG(RA)), 0);
    END /* OP_LA. */;
  WHEN(OP_LI, OP_LUI, OP_LA_CON) CALL DEMOTE;
  WHEN(OP_NI) DO;
    IF (SIG(RA) & X->REG($RI_IM)) = SIG(RA) THEN
      /* The NI turns off only insignificant bits.  Change it to an MR.
         Condition code is irrelevant now, as compares to zero are present.*/
      CALL CHANGE_TO_MR;
    ELSE DO;
      CALL DEMOTE;
      CALL SIGUSE(P5AREG(X, $RB), X->DEAD($RB), SIG(RA) & X->REG($RI_IM));
      END;
```

```
      END /* OP_NI. */;
    OTHERWISE DO;              /* All RI ops are done above. */
      CALL XERROR(BLDMSG1(XE_1018, OPS_NAME(OP)), 0);
      /* 1018C P5OPTB, unexpected RI op: 'op_code' */
      END /* OTHERWISE. */;
    END /* ETF_RI. */;

WHEN(ETF_RS) SELECT(OP);
    WHEN(OP_USES, OP_SETS);    /* No-ops. */
    WHEN(OP_STC, OP_STCZ) DO;
      /* (STCD, STCS, and STCX not used or won't be seen here). */
      CALL SIGUSE_ABX('000000FF'XB, SIGBX, SIGBX);
      END /* OP_STC, ....*/;
    WHEN(OP_STH, OP_STHA, OP_STHZ) DO;
      /* (STHD, STHS, and STHX not used or won't be seen here). */
      CALL SIGUSE_ABX('0000FFFF'XB, SIGBX, SIGBX);
      END /* OP_STH, .... */;
    WHEN(OP_CALL)          •
      CALL SIGCALL;            /* Handle CALL. */
    OTHERWISE DO;              /* Default RS.  Assume it uses all 32 bits
                                  of each of the possible input regs. Used
                                  for: all loads, fullword stores, CVFLFS,
                                  and CVFSFL. */
      IF X->DEF >= 0 THEN      /* If not a store: */
        IF RA < BIT(32) THEN CALL DEMOTE;
      CALL SIGUSE_ABX('FFFFFFFF'XB, SIGBX, SIGBX);
      END /* OTHERWISE. */;
    END /* ETF_RS. */;

WHEN(ETF_RSR) DO;
    SELECT(OP);
      WHEN(OP_XSTC) MASK = '000000FF'XB;
      WHEN(OP_XSTH) MASK = '0000FFFF'XB;
      OTHERWISE     MASK = 'FFFFFFFF'XB;   /* XST. */
      END /* SELECT(OP). */;
    CALL SIGUSE_RSR(MASK);
    END /* ETF_RSR. */;

WHEN(ETF_RSS) DO;
    SELECT(OP);
      WHEN(OP_A_RX, OP_AH_RX, OP_MH_RX, OP_S_RX, OP_SH_RX)
        MASK = RP(SIG(RA));
      WHEN(OP_N_RX, OP_O_RX, OP_X_RX)
        MASK = SIG(RA);
      WHEN(OP_A_SB, OP_N_SB, OP_O_SB, OP_S_SB, OP_X_SB)
        MASK = '000000FF'XB;
      WHEN(OP_A_SH, OP_N_SH, OP_O_SH, OP_S_SH, OP_X_SH)
        MASK = '0000FFFF'XB;
      OTHERWISE              /* MVC, MVCL, CLC, CLCL, AFS, CFS, and
                                the other floating point ops; C_RX, CH_RX,
                                CI_RX, ACONC, AMOVE, A_S, AI_S, and the other
                                fullword "to stg" ops; AI_SB and the other
                                "immed to stg" ops; TM_SB, TGT_RX, ...,
                                and anything else we may have forgotten. */
        MASK = 'FFFFFFFF'XB;
      END /* SELECT(OP) */;

/* Demote it if it has a real target reg and is not a comparison op. */
    IF RA < BIT(32) THEN IF OPS_REGFORM(OP) ¬= 7 THEN CALL DEMOTE;
    CALL SIGUSE_RSS(MASK);
    END /* ETF_RSS. */;
```

```
      OTHERWISE
         CALL XERROR(BLDMSG1(XE_1017, OPS_NAME(OP)), 0);
         /* 1017C  P5OPTB, unexpected OPS_TYPE for 'op_code' */

END /* SELECT(OPS_TYPE(OP)). */;

/*----------------------------------------------------------------------*/

DEMOTE: PROC;
   SELECT;
      WHEN(SIG(RA) > '0000FFFF'XB) RETURN;   /* (Is initialized to 0). */
      WHEN(SIG(RA) > '000000FF'XB) X->TARGLEN = 2;
      OTHERWISE                    X->TARGLEN = 1;
      END;
   END DEMOTE;

/*----------------------------------------------------------------------*/

SIGUSE_BCD: PROC(BITSB, BITSC, BITSD);
   /* Records uses of RB, RC, and RD fields. */
   DCL (BITSB, BITSC, BITSD) BIT(32) VALUE, /* Usage bits. */
       (RB, RC, RD) integer;                /* Real register numbers. */

/* Get the real register numbers.  If some of them are equal, their usage
   bits must be or'ed together. */

RB = P5AREG(X, $RB);
   RC = P5AREG(X, $RC);
   IF BITSD ¬= 0 THEN RD = P5AREG(X, $RD);

IF RB = RC THEN BITSB, BITSC = BITSB | BITSC;
   IF BITSD ¬= 0 THEN DO;
      IF RB = RD THEN BITSB, BITSD = BITSB | BITSD;
      IF RC = RD THEN BITSC, BITSD = BITSC | BITSD;
      END;

CALL SIGUSE(RB, X->DEAD($RB), BITSB);
   CALL SIGUSE(RC, X->DEAD($RC), BITSC);
   IF BITSD ¬= 0 THEN CALL SIGUSE(RD, X->DEAD($RD), BITSD);

END SIGUSE_BCD;

/*----------------------------------------------------------------------*/

SIGUSE_ABX: PROC(BITSA, BITSB, BITSX);
   /* Records uses of RA if it's a "store" op, base, and index. */

DCL (BITSA, BITSB, BITSX) BIT(32) VALUE, /* Usage bits. */
       (RB, RX) INTEGER;                    /* Real register numbers. */

/* Get the real register numbers.  If some of them are equal, their usage
   bits must be or'ed together. */

RB = P5AREG(X, $RS_B);
   RX = P5AREG(X, $RS_X);

IF RA = RB THEN BITSA, BITSB = BITSA | BITSB;
   IF RA = RX THEN BITSA, BITSX = BITSA | BITSX;
   IF RB = RX THEN BITSB, BITSX = BITSB | BITSX;
```

```
    IF X->DEF = -1 THEN CALL SIGUSE(RA, X->DEAD($RA), BITSA);
    CALL SIGUSE(RB, X->DEAD($RS_B), BITSB);
    CALL SIGUSE(RX, X->DEAD($RS_X), BITSX);

END SIGUSE_ABX;

/*-------------------------------------------------------------------*/

SIGUSE_RSR: PROC(BITSC);
    /* Records uses of RC and B as a base reg. */
    DCL BITSC     BIT(32) VALUE,    /* Usage bits. */
        (RB, RC) INTEGER;           /* Real register number. */

/* Get the real register numbers.  If some of them are equal, their usage
    bits must be or'ed together. */

RB = P5AREG(X, $RS_B);
    RC = P5AREG(X, $RS_RC);
    /* This subroutine used for RSR's, which don't have index regs. */
    IF RB = RC THEN BITSC = BITSC | SIGBX;

CALL SIGUSE(RB, X->DEAD($RS_B), SIGBX);
    CALL SIGUSE(RC, X->DEAD($RS_RC), BITSC);

END SIGUSE_RSR;

/*-------------------------------------------------------------------*/

SIGUSE_RSS: PROC(BITSX1);
    /* Records uses of all regs for an RSS op.  The bit usage for index
    is specified by the MASK parameter.  The bit usage of the other regs are
    SIGBX, except 'FFFFFFFF' for RBC2 (CLCL/MVCL). */

DCL BITSX1      BIT(32) VALUE,                  /* Usage bits for X1. */
        (RB1, RX1, RR1, RB2, RX2, RR2) INTEGER;     /* Real regs. */

/* Get the real register numbers.  If some of them are equal, their usage
    bits must be or'ed together. */

RB1 = P5AREG(X, $RSS_B1);
    RX1 = P5AREG(X, $RSS_X1);
    RR1 = P5AREG(X, $RSS_RBC1);
    RB2 = P5AREG(X, $RSS_B2);
    RX2 = P5AREG(X, $RSS_X2);
    RR2 = P5AREG(X, $RSS_RBC2);

IF RX1 = RB1 THEN BITSX1 = BITSX1 | SIGBX;
    IF RX1 = RR1 THEN BITSX1 = BITSX1 | SIGBX;
    IF RX1 = RB2 THEN BITSX1 = BITSX1 | SIGBX;
    IF RX1 = RX2 THEN BITSX1 = BITSX1 | SIGBX;
    IF RX1 = RR2 THEN BITSX1 = 'FFFFFFFF'XB;

CALL SIGUSE(RB1, X->DEAD($RSS_B1), SIGBX);
    CALL SIGUSE(RX1, X->DEAD($RSS_X1), BITSX1);
    CALL SIGUSE(RR1, X->DEAD($RSS_RBC1), SIGBX);
    CALL SIGUSE(RB2, X->DEAD($RSS_B2), SIGBX);
    CALL SIGUSE(RX2, X->DEAD($RSS_X2), SIGBX);
    CALL SIGUSE(RR2, X->DEAD($RSS_RBC2), 'FFFFFFFF'XB);

END SIGUSE_RSS;

/*-------------------------------------------------------------------*/
```

```
CHANGE_TO_MH: PROC OPENED;
   /* Changes instruction x to an MH instruction, using
   the same registers as the original instruction. */

X->OPCODE = OP_MH;
   END CHANGE_TO_MH;

/*--------------------------------------------------------------------------*/

CHANGE_TO_MR: PROC OPENED;
   /* Changes instruction X to an MR instruction, using
   the same target and RB fields as the original instruction.  Used, for
   example, when an NI is "omitted."  That is, NI R1,R2,'xxx'X is changed
   to MR R1,R2.
        If R1 = R2, the instruction could be deleted.  However, this
   would be largely superfluous because phase 5 later omits null moves
   anyway (P5ARFC). */

DCL I INTEGER;

OP = OP_MR;
   DO I = 2 TO X->KILL;
      $ZERO(X->OPERAND(I));
      END;
   CALL SIGUSE(P5AREG(X, 1), X->DEAD(1), SIG(RA));
   END CHANGE_TO_MR;

/*--------------------------------------------------------------------------*/

CHANGE_TO_RINM: PROC(SHIFT, MASK);
   /* Machine is M68000, X points to an SLI, SRI, or SARI.  In the case of
   SARI, no bits to the left of where the sign bit is shifted to, are
   significant.  Here we change it to a RINM.  P5AM680 will produce ROL or
   ROR, followed by NI if the mask is not all 1's. */

DCL SHIFT INTEGER VALUE,        /* Amount to shift left. */
       MASK  BIT(32) VALUE;

DCL A(0:0,3) INTEGER,
       Z OFFSET(IL);
   Z = ILNEW(X,X->IL_FC,
       X->SOURCE_LINE, X->OPENED, OP_RINM, $RRR_MAX, A);
   Z->OPERAND($RA) = X->OPERAND($RA);
   Z->OPERAND($RB) = X->OPERAND($RB);
   Z->OPERAND_TYPE($RC) = O_INTEGER;
   Z->OPERAND_TYPE($RD) = O_INTEGER;
   Z->REG($RC) = SHIFT;
   Z->REG($RD) = MASK;
   ILDEL(X);
   END CHANGE_TO_RINM;
   END SIGRFC;

/*--------------------------------------------------------------------------*/

SIGRESET: PROC;
   /* Resets the significance bits for all registers to all 1's (all bits
   presumed to be significant). */

DCL II INTEGER;
```

```
   DO II = -1 TO LASTREG;
      SIG(II) = 'FFFFFFFF'XB;
      END;
   END SIGRESET;

/*------------------------------------------------------------------*/

SIGBC: PROC OPENED;                    /* Handle conditional branch. */
   /* We set all bits of all registers = '1'b, except for the tested bit
      of the tested register, which is handled like any "use." */

DCL CR_INDEX  INTEGER,              /* Tested bit number, 0-31. */
       MASK      BIT(32);              /* Has '1'b in position CR_INDEX+1. */

CALL SIGRESET;                      /* Reset all bits of all regs to '1'b. */
   CR_INDEX = X->REG($B_CRBIT);        /* The tested bit number. */
   /* If last use, set significant bits of the tested reg. */
   MASK = 0;
   SUBSTR(MASK, CR_INDEX+1, 1) = '1'B;
   CALL SIGUSE(P5AREG(X, $B_T), X->DEAD($B_T), MASK);
   END SIGBC;

/*------------------------------------------------------------------*/

SIGCALL: PROC OPENED;
   /* Sets the significance bits to reflect what is alive on entry to a called
      subroutine. We assume it uses all 32 bits of all the input regs. */

DCL I INTEGER;

DO I = X->DEF+1 TO X->USE;
      CALL SIGUSE(P5AREG(X, I), '1'B, 'FFFFFFFF'XB);
      END DO I;

/* We may ignore the implied use of reg_auto, as that doesn't participate
      in these optimizations, and the S/370 set of r14 that a CALL implies. */

END SIGCALL;

/*------------------------------------------------------------------*/

SIGUSE: PROC(RR, DB, BITS);
   /* Records a use of register RR, last use if DB (dead bit) is
      on. It is a use of BITS bits of register RR. */
   DCL RR    INTEGER VALUE,            /* Real register number. */
       DB    BIT(1)   VALUE,           /* Applicable dead bit. */
       BITS  BIT(32)  VALUE;           /* Significant bits. */

IF RR <= 31 THEN DO;
     IF DB THEN DO;
        SIG(RR) = BITS;
        END;
     ELSE DO;
        SIG(RR) = SIG(RR) | BITS;      /* OR in the given bits. */
        END;
     END /* IF RR <= 31. */;
   END SIGUSE;

/*------------------------------------------------------------------*/
```

```
RP: PROC(X) RETURNS(BIT(32));
   /* Right-propagates the "on" bits of X, i.e., RP(00010010) = 00011111. */
   DCL X BIT(32) VALUE;
   DO WHILE (X & (X + 1));
     X = ((X & (X + 1)) - 1) | X;
     END;
   RETURN(X);
   END RP;

%INCLUDE GL_OPR;
END P5OPTB;
```

Having thus described our invention, what we claim is new, and desire to secure by Letters Patent is:

1. In a high speed electronic computing system having an optimizing compiler or assembler program resident in the system memory together with a program to be optimized, the improvement which comprises a code optimizing method operable within said optimizing compiler or assembler after the register allocation phase for performing significant bit analysis, the results of said analysis being utilized during the final code generation phase of the compiler operations for generating the most efficient form of computer instruction available for producing the required result, said method comprising;

establishing in the system a significant bit table (SBT) in memory having an addressable storage location relating to each working register assigned to a program being compiled and accessing said table at a location derivable from the register number assignment of the operands of an instruction sequence, sequentially examining in the system linear blocks in a linear code instruction stream in reverse order and determining:

if an instruction being evaluated is a non-computational "label," then obtaining the next instruction, if an instruction is a return or branch instruction, then setting the significance value of all of the storage locations in the significant bit table to "all bits significant" and obtaining the next instruction, if an instruction is computational type, then determining from the instruction format for each instruction those bits of the result which must be retained to produce a required significance value and storing said significance a value in the SBT for each input operand to that instruction, sequentially accessing and evaluating in the system preceding instructions in the instruction stream and utilizing and storing in the SBT a particular input operand's significance value to establish a new significance value for the operand in any such preceding instruction whose result becomes an input operand to a subsequent instruction, continuing said method in reverse order, in the system until all of the instructions in each linear block of the instruction stream have been evaluated and the appropriate significance values stored in the SBT, and generating in the system the most efficient instruction form for each instruction by utilizing the values stored in the SBT by said evaluation procedure by specifying an instruction form which will generate the minimum number of significant bits required to meet each operand's computed significance value.

2. A method for a significant bit analysis as set forth in claim 1 wherein the computational instruction comprises an 'add' or 'subtract' instruction which requires setting or adding to the significant bits value in the SBT entry for each input register all the bits at and to the right of the leftmost significant bit of the SBT entry for the result register.

3. A method for significant bit analysis as set forth in claim 1 wherein the computational instruction comprises a "move register" or an "AND, OR, or EXOR" logical operation" including;

setting or adding to the significant bits value in the SBT for each input register of the instruction, the significant bits value of the result register.

4. A method for significant bit analysis as set forth in claim 1 wherein the computational instruction comprises a "compare registers" operation including;

setting the significant bits value in the SBT for each input register to "all bits significant."

5. A method for significant bit analysis as set forth in claim 1 wherein the computational instruction comprises a "store word" operation including;

setting or adding a significance value to the significant bit table at the location relating to the register to be stored equal to the field length of a word in the target system and setting or adding a significance value to the significant bit table at locations related to the base and index registers, a value equal to the field length of the base and index fields required by the target system memory.

6. A method for significant bit analysis as set forth in claim 1 wherein the computational instruction comprises a "store byte" operation including;

setting or adding a significance value to the significant bit table at the location relating to the register to be stored equal to the field length of a byte in the target system and setting or adding a significance value to the significant bit table at locations related to the base and index registers, a value equal to the field length of the base and index fields required by the target system memory.

7. A method for significant bit analysis as set forth in claim 1 wherein the computational instruction comprises an "AND immediate" instruction including;

setting or adding to the significance value in the significant bit table at the location relating to the input register, the significance value of the result of the instruction, 'AND'ed' with the "immediate mask."

8. In a high speed electronic computing system having an optimizing compiler or assembler program resident in the system memory together with a program to be optimized, the improvement which comprises a code optimizing method operable within said optimizing compiler or assembler after the register allocation phase of the compile operation for generating the fastest and most compact computer instruction that is adequate to do the computation desired, and for assigning actual registers to store the operands required for each instruction, said method comprising;

sequentially examining in the system linear blocks in a linear code instruction stream accessed from memory in reverse order and determining from the instruction format for each instruction those bits of the result which must be retained to produce a required significance value and marking each input operand to that instruction as requiring the same significance value, sequentially accessing and evaluating in the system preceding instructions in the instruction stream and utilizing a particular input operand's significance value to establish a new significance value for the operand in any such preceding instruction whose result becomes an input operand to a subsequent instruction, continuing said method in reverse order in the system until all of the instructions in each linear block of the instruction stream have been evaluated and marked with appropriate significance values, assigning a significance value table (s.v.) memory location relating to each system register for storing significance value data for operands to be stored in each said register, setting each said (s.v.) memory location to a predetermined maximum significance value at the beginning of said procedure, changing the significance value of a particular memory location when it is determined that the operand to be stored in the related register has a significance value other than that already present, and generating the most efficient instruction form, for the entire instruction stream, utilizing said significance value table for those instructions whose significance values were marked by said evaluation procedure by specifying an instruction form which will generate the minimum number of significant bits required to meet each operand's computed significance value.

9. A method as set forth in claim 8 including;
after completion of an evaluation procedure,
accessing said (s.v.) memory at the assigned locations relating to the result of each instruction and marking said instruction with the significance value stored in said table for use in the "final code generation" phase of the compiler.

10. A method as set forth in claim 8 including;
organizing said (s.v.) memory locations as an addressable array having a row for each register in the system and sufficient storage length to represent the maximum possible values of bit significance.

11. A method as set forth in claim 10 including;
determining if the use of a particular register is a "last use" in the instruction stream being evaluated before entering a significance value in the (s.v.) memory location related to said register,
substituting the new value for the old value if it is a "last use," and
'OR'ing the new value with the old value if it is not a "last use".

* * * * *